United States Patent [19]

Roselli

[11] Patent Number: 4,860,970
[45] Date of Patent: Aug. 29, 1989

[54] NONRIGID WING AIRCRAFT

[76] Inventor: Auro Roselli, 319 E. 51st St., New York, N.Y. 10022

[21] Appl. No.: 935,733

[22] Filed: Nov. 28, 1986

Related U.S. Application Data

[63] Continuation-in-part of Ser. No. 807,211, Dec. 11, 1985, abandoned, which is a continuation of Ser. No. 559,631, Dec. 9, 1983, abandoned.

[51] Int. Cl.$^4$ .............................................. B64C 31/02
[52] U.S. Cl. ..................................... 244/16; 244/900; 244/902
[58] Field of Search .................. 244/DIG. 13, 1.2, 16, 244/145, 146, 153 R, 900–904

[56] References Cited

U.S. PATENT DOCUMENTS

| | | | |
|---|---|---|---|
| 3,412,963 | 11/1968 | Struble, Jr. | 244/146 |
| 3,428,277 | 2/1969 | Everett, Jr. | 244/146 |
| 3,480,238 | 11/1969 | Barish | 244/146 |
| 3,700,191 | 10/1972 | Page | 244/16 |
| 3,749,337 | 7/1973 | Jalbert | 244/145 |
| 3,822,844 | 7/1974 | Sutton | 244/145 |
| 4,568,043 | 2/1986 | Schmittle | 244/13 |
| 4,634,080 | 1/1987 | McNally | 244/13 |

FOREIGN PATENT DOCUMENTS 2268687 11/1975 France ................. 244/145

OTHER PUBLICATIONS

Bugg et al, "Low Speed Tests of An All Flex Parawing . . . ", NASA, TN D-4010, 6-1967.

Primary Examiner—Galen L. Barefoot
Attorney, Agent, or Firm—Natter & Natter

[57] ABSTRACT

An aircraft includes a nonrigid dynamically inflated airfoil wing which carries an operator. The operator is suspended by a plurality of shrouds which interconnect the wing to a control stick. The control stick position is varied to change the angle of attack of the wing. A transverse control bar is connected to the wing tips for direction control. The center of gravity of the total aircraft is rearward of the center of lift. The wing includes air intake orifices at its leading edge and at least one trailing edge exhaust aperture for inflation by airspeed relative to the wing. A spanwise tubular plenum may be employed for air flow control through the wing.

23 Claims, 3 Drawing Sheets

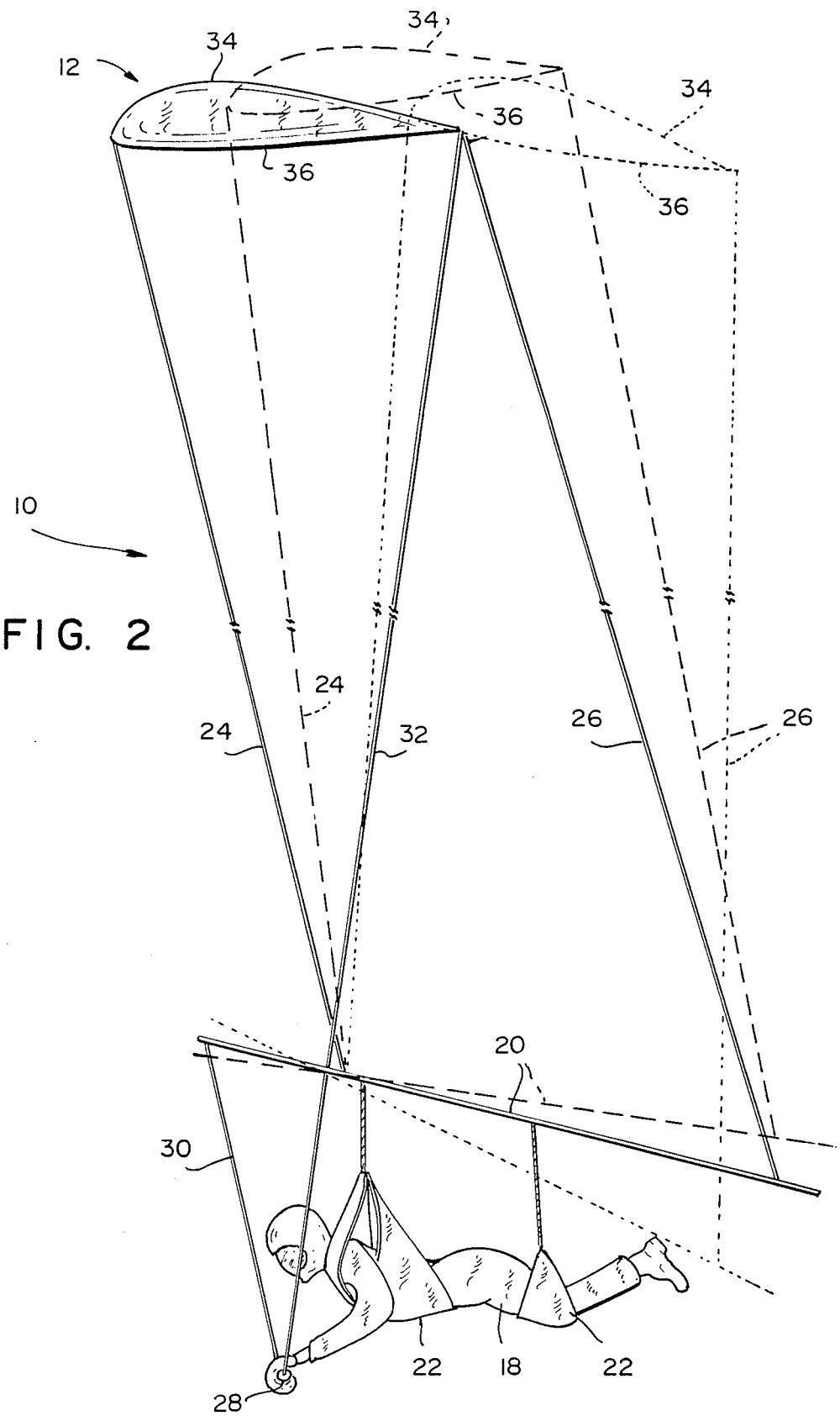

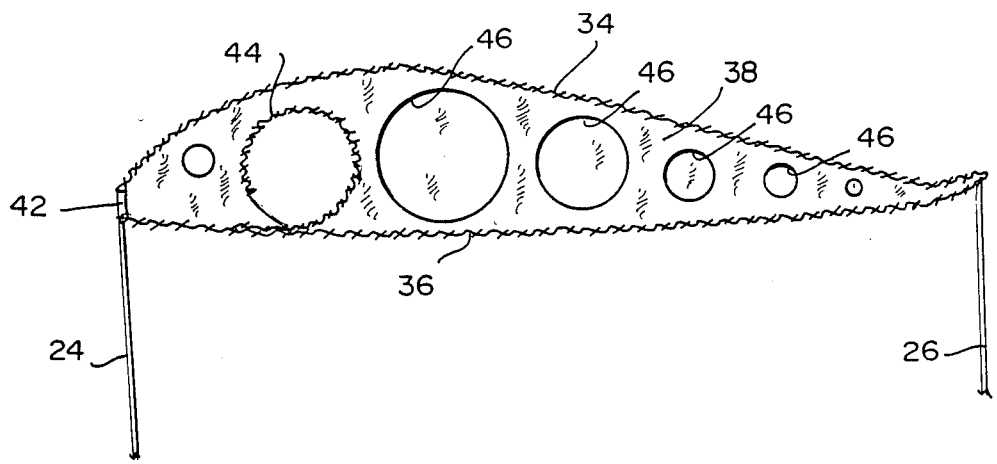
FIG. 3
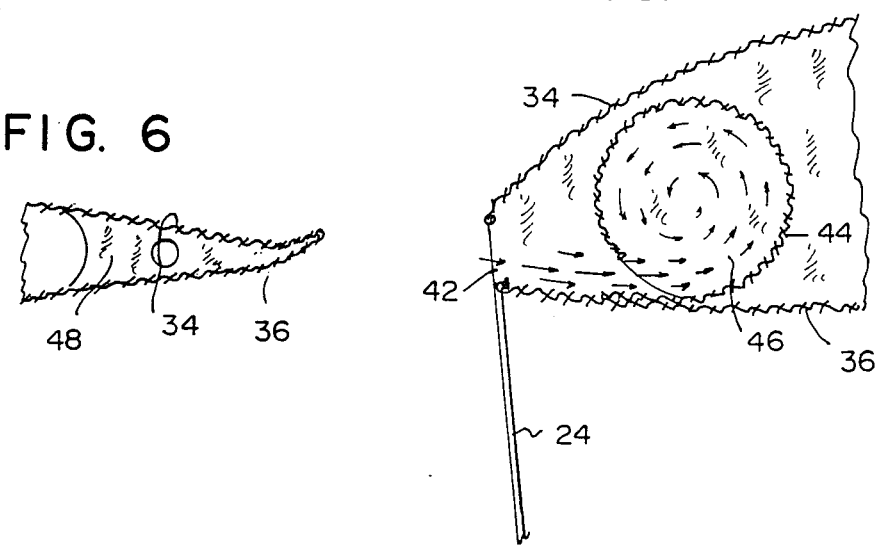
FIG. 6
FIG. 7
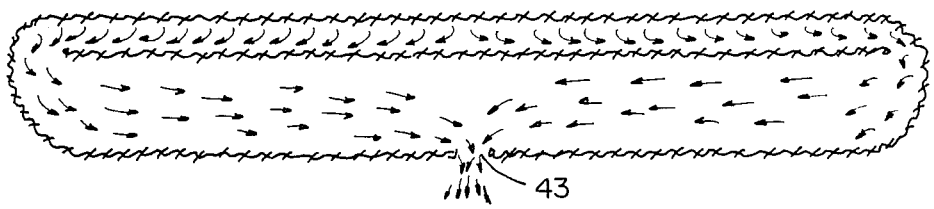
FIG. 8
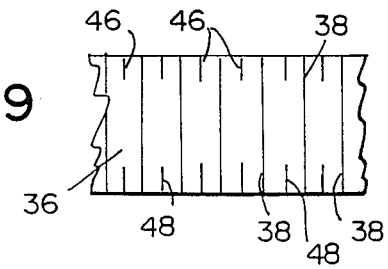
FIG. 9

NONRIGID WING AIRCRAFT

RELATED APPLICATIONS

This application is a continuation-in-part of application Ser. No. 807,211 filed Dec. 11, 1985 (now abandoned) which is a continuation of application Ser. No. 559,631 filed Dec. 9, 1983 now abandoned.

BACKGROUND OF THE INVENTION

1. Field of the Invention

The present invention relates to heavier-than-air craft and more particularly to motorless aircraft having a suspended operator/payload.

2. Background Art

The need for low cost energy efficient transportation has become increasingly recognized since the energy crisis of the 1970's. Although increased fuel costs have led to various developments in the field of transport, the majority of efforts heretofore have been directed toward providing greater fuel efficiencies and alternate motor power sources rather than development of motorless transport.

Sail planes and gliders comprised rigid framed motorless aircraft of lightweight. Controlled flight in atmospheric updrafts was achieved due to their aerodynamic configurations. The use of such aircraft was, however, relegated to sports enthusiasts due to their inherent unreliability. The lack of reliability of such aircraft was in part related to their dependence on specified atmospheric conditions which placed limitations on travel direction and distance. Further, such aircraft were dangerous to operate and, in addition, due to their rigid frame construction, were susceptible to frequent structual damage upon landing.

SUMMARY OF THE INVENTION

In compendium, the invention comprises a nonrigid aircraft including a frameless dynamically inflated wing which carries an operator. The operator is suspended beneath the wing at a distance somewhat longer than that of the wing span by a plurality of flexible shrouds interconnecting the wing to a control stick. The center of gravity of the total craft including the payload is rearward of the center of lift.

The operator controls the attitude of the stick to vary the angle of attack through a group of flexible shrouds which connect the front of the stick to spaced locations along the leading edge of the wing and a further group of flexible shrouds which interconnect the rear of the stick to spaced locations along the trailing edge of the wing. A transverse control bar is connected to the stick and is grasped by the operator to vary the stick attitude. In addition, the ends of the control bar are connected by flexible shrouds to the wing tips at the trailing edge for direction control.

The wing is formed of flexible panels and may include chordal ribs for airfoil configuration definition and a spanwise tubular plenum for air flow control through the wing. A plurality of air intake orifices are formed along the leading edge with air flow being directed into the plenum and exhausted through one or more trailing edge orifices.

The center of gravity is rearward of the center of lift, hence, the wing tends to pitch its leading edge upward, however, the payload weight counteracts such force and the suspended payload is carried forward.

From the foregoing compendium, it will be appreciated that it is a consideration of the present invention to provide a nonrigid wing aircraft of the general character described which is not subject to the disadvantages of the background art aforementioned.

Another consideration of the present invention is to provide a nonrigid wing aircraft of the general character described which is capable of efficient, controlled transport.

A feature of the present invention is to provide a nonrigid wing aircraft of the general character described wherein the center of lift is forward of the center of gravity so that the resultant pitch moment tends to pull a suspended payload forward.

An aspect of the present invention is to provide a motorless aircraft of the general character described which is capable of safely withstanding rough landings without structual damage.

A further feature of the present invention is to provide a nonrigid wing aircraft of the general character described which includes a wing inflated by relative wind speed.

Yet another consideration of the present invention is to provide a nonrigid wing aircraft of the general character described which includes a wing inflated by relative wind speed and a spanwise plenum for directing airflow within the wing.

Yet another aspect of the present invention is to provide a nonrigid wing aircraft of the general character described which counteracts fore-and-aft instability by proportional weight distribution at both the leading and trailing wing edges and with the payload positioned beneath the wing a distance somewhat greater than the wing span.

An additional feature of the present invention is to provide a nonrigid wing aircraft of the general character described which provides for fuelless low cost transport.

A further aspect of the present invention is to provide a nonrigid wing aircraft of the general character described which can be stored in but a modicum of space when not being utilized for air transport.

A further consideration of the present invention is to provide a nonrigid wing of the general character described which may be utilized as a sail for the transport of non-airborne payloads such as boats.

Other aspects, features and considerations of the present invention in part will be obvious and in part will be pointed out hereinafter.

With these ends in view, the invention finds embodiment in certain combinations of elements, arrangements of parts and series of steps by which the aspects, features and considerations aforementioned and certain other aspects, features and considerations are hereinafter attained, all is fully described with reference to the accompanying drawings and the scope of which is more particularly pointed out and indicated in the appended claims.

BRIEF DESCRIPTION OF THE DRAWINGS

The accompanying drawings in which is shown one of the various possible exemplary embodiments of the invention:

FIG. 2 is an enlarged scale side elevational view of the aircraft including the operator and illustrating a control stick from which the operator is carried, and a control bar suspended from the stick; also shown, in dashed lines, is the wing position at a reduced angle of attack, and in dotted lines, the wing position at an increased angle of attack;

FIG. 3 is an enlarged scale sectional view through the wing, the same being taken substantially along the plane 3—3 of FIG. 1 and illustrating a chordal rib which shapes the wing airfoil;

FIG. 6 is a fragmentary sectional view through the wing, similar to that of FIG. 5 at the trailing edge thereof and illustrating a further partial rib;

FIG. 7 is an enlarged scale fragmentary sectional view through the wing, the same being taken substantially along the plane 7—7 of FIG. 1, with portions such as ribs deleted for clarity and illustrating an optional tubular plenum positioned behind the leading edge for air flow control;

FIG. 8 is a schematized reduced scale fragmentary plan view of the wing, with a dorsal panel removed and depicting the internal air flow pattern; and FIG. 9 is a reduced scale fragmentary plan view of the wing, with a portion of the dorsal panel removed, and illustrating the relative positions of the ribs.

DESCRIPTION OF THE PREFERRED EMBODIMENT

Figure 1:
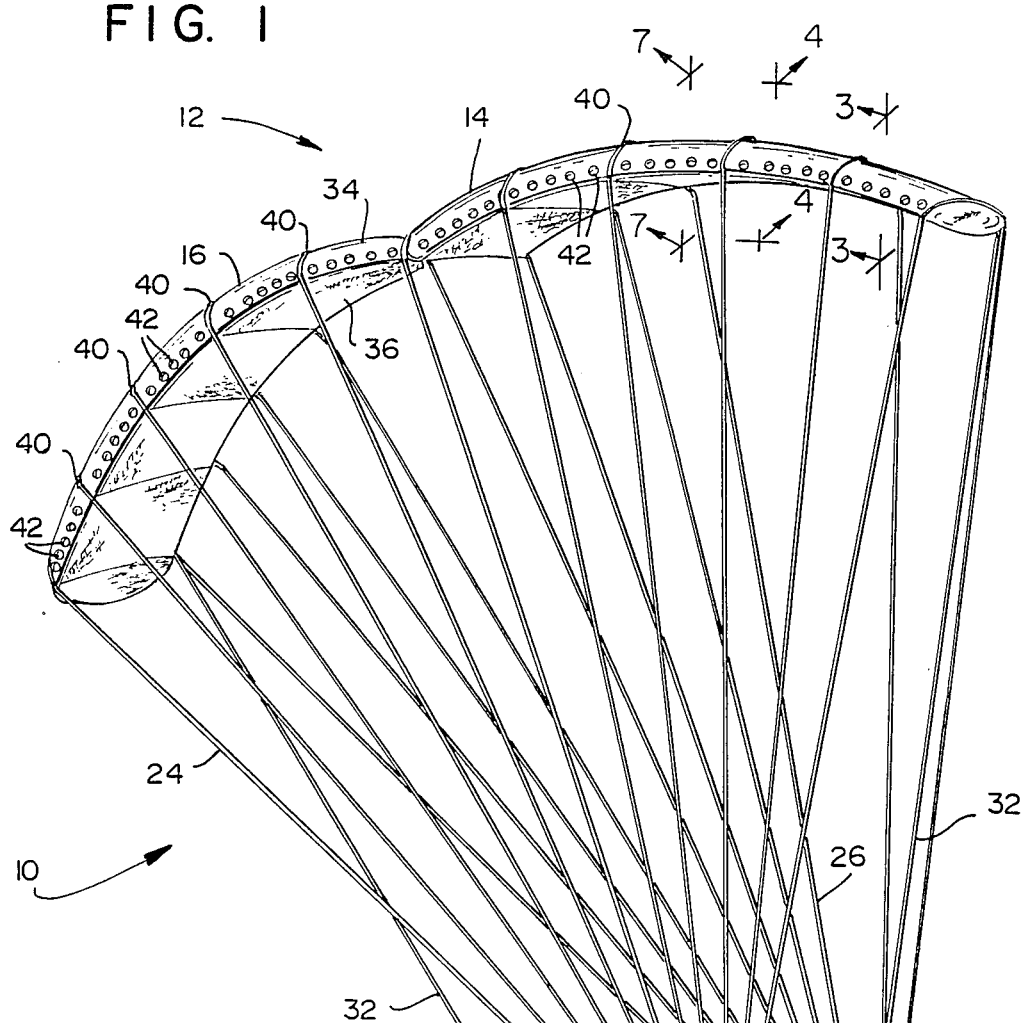
FIG. 1 is a perspective illustration of a nonrigid wing aircraft constructed in accordance with and embodying invention and illustrating an operator suspended from beneath an inflated wing.

Referring now in detail to the drawings, the reference numeral 10 denotes generally an aircraft constructed in accordance with and embodying the invention. The aircraft 10 includes a nonrigid wing 12 comprised of a pair of longitudinally interconnected wing segments 14, 16. Each of the segments 14, 16 include a slightly curved or arcuate front eleventional configurational in flight as illustrated in FIG. 1.

The wing 12 carries an operator/payload 18 suspended from a control stick 20 and craddled in a harness 22. A group of flexible shrouds 24 are interconnected to a point adjacent the forward end of the stick 20 and extend to evenly spaced locations along the leading edge of the wing 12. Similarly, a group of flexible shrouds 26 extend from a point adjacent the rearward end of the stick 20 to equidistantly spaced locations along the trailing edge of the wing 12. The arcuate elevational configuration of the wing segments 14, 16 results from a determination of the appropriate lengths for each of the shrouds 24, 26.

A hand grippable control bar 28 is suspended, adjacent the forward end of the stick by a pair of flexible shrouds 30, to be grasped by the operator. One of the pair of flexible direction control shrouds 32 extends from each end of the control bar 28 to the trailing edge of an associated wing tip for direction control through reverse yaw.

The operator 18 controls the attitude of the control stick 20 to vary the angle of attack of the wing 12 by weight shifting and by exerting force on the control bar 28. The angle of attack of the wing 12 follows the inclination angle of the control stick 20 through the leading edge shrouds 24 and the trailing edge shrouds 26. As mentioned, for direction control, the shrouds 32 extend from the ends of the control bar 28. By clockwise or counter clockwise rotation of the control bar 28 relative to the axis of the control stick 20, the wing tips will vary their angle of attack to thereby provide an appropriate steering control.

The wing 12 is formed of durable resilient sheet material such as woven and/or laminated fabric or reinforced thermoplastic films. The wing 12 includes a dorsal layer 34 and a ventral layer 36. The dorsal and ventral layers 34, 36 assume their airfoil configuration when the wing 12 is under dynamic inflation due to relative wind speed as will hereinafter be described. With reference to FIG. 3, wherein the airfoil configuration of the wing 12 is illustrated, it should be appreciated that the airfoil shape is defined by a plurality of chordal ribs 38 made of fabric or other flexible sheet material similar to or the same as layers 34, 36. A suitable airfoil configuration for the wing 12 in accordance with the present invention as shown in FIG. 3, comprises a modification of airfoil MO 6 13 128 having, however, a more pronounced curvature on its ventral surface adjacent the trailing edge.

Figure 4:
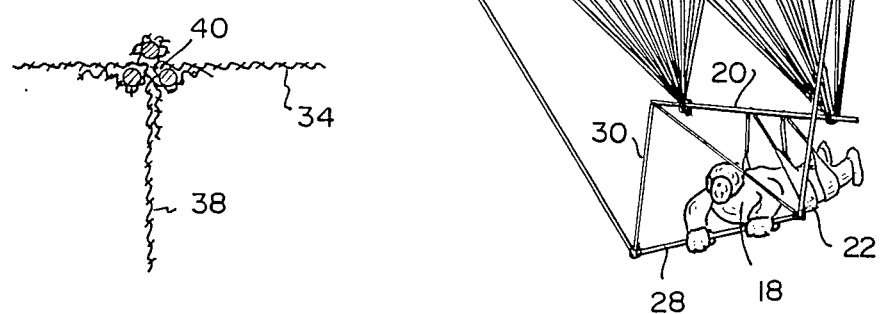
FIG. 4 is an enlarged scale fragmentary sectional view through the wing and a rib, the same being taken substantially along the plane 4—4 of FIG. 1 and illustrating a typical seam.

Various segments of sheet material which comprise the dorsal and ventral layers 34, 36 are joined together along welted seams 40 as illustrated in FIG. 4. Overlapping layers at such seams are sewn, heat sealed, bonded or otherwise secured. It should be appreciated that at each of the seams 40, a chordal rib 38 may be provided. Optionally, the chordal ribs 38 may be provided at alternate seams only.

Pursuant to the invention, the wing 12 is dynamically inflated by relative wind speed to assume its airfoil configuration. For this purpose, a group of orifices 42 are provided along the leading edge of the wing 12. Optionally, a single elongated orifice may be provided.

With reference now to FIG. 8, it will be seen that air flow extends through the wing 12 by first entering the leading edge orifices 42 and exiting through one or more trailing edge apertures 43. In order to provide direction control for the air flow, a spanwise tubular plenum 44 is positioned adjacent the leading edge of the wing 12 as illustrated in FIG. 7. The plenum 44 directs air flow in a vortex pattern toward the wing tips. Thereafter, air flow extends toward the trailing edge aperture(s) 43. In order to permit such spanwise air flow, a plurality of openings 46 are provided in the chordal ribs 38. It should also be noted that the tubular plenum 44 extends through an appropriate opening in each of the ribs 38.

Figure 5:
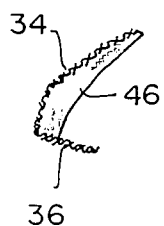
FIG. 5 is a fragmentary sectional view through the wing, similar to that of FIG. 3 yet showing only a leading edge portion of the wing and a partial rib.

It may be additionally noted that shape defining and/or reinforcing ribs which do not extend completely across the airfoil cord may be provided. A typical example is illustrated in FIG. 5 wherein a partial leading edge rib 46 is illustrated. A typical partial trailing edge rib 48 is illustrated in FIG. 6.

The chordal ribs 38 and the partial ribs 46, 48 may be alternately spaced spanwise along the wing 12 as illustrated in FIG. 9. It should be appreciated that suitable air flow may be provided through the wing 12 without the use of the plenum 44 and/or without the ribs 46, 48. The wing 12 may have a span of approximately 30 feet and is configured with a relatively lightweight, flexible and resilient materials. The shrouds 24, 26 are of a length at least equal to that of the wing span and preferably somewhat longer, for example, in the order of 40 feet. Appropriate lift can be generated to carry a 160 pound payload with a wing 12 having approximately 150 square feet of surface area and a chordal length of approximately 5 feet. The payload weight is distributed to the wing 12 through the leading edge shrouds 24 and trailing edge shrouds 26 with the greatest proportion of such weight load being carried by the leading edge shrouds 24. Bearing in mind that the total aircraft center of gravity is rearward of the center of lift, unlike a conventional aircraft, a positive moment is generated by the lift force which tends to elevate the leading edge of the wing and increase the angle of attack. Such moment is counteracted, however, due to the extended length between the actual payload and the wing. The actual angle of attack may be controlled by the operator through shifting of body weight and downward exertion of force on the control bar 28. The flight of the aircraft 10 will be that of a sailplane in its means of propulsion with its center of lift forward of its center of gravity to prolong flight.

It should be appreciated that since the aircraft 10 is formed of resilient flexible material it may be folded or otherwise compacted for storage or transport to an intended departure site. Thereafter, at the departure site, the wing, is unfurled. The shrouds extended and the operator manipulating the leading edge of the wing upwind to commence inflation. The wing is manipulated to obtain relative wind velocity under the ventral surface of the wing to generate lift in a kite like fashion. Finally, the operator reduces the angle of attack and increases relative wind speed by possibly running into the wind, to generate airfoil lift rather than kite lift.

As previously mentioned, the flexible resilient nonrigid structure of the wing permits safe, nondestructive landings and provides an economical controlled mode of transport. The payload need not be a human operator but may comprise freight and flight controls can be provided by a suitable remote apparatus such as radio controls for changing the attitude of the control stick and the control bar through load shifting or otherwise.

The wing 12 may also be employed with appropriate shrouds to generate forward thrust for land or water based vehicles as a supplement to existing propulsion systems or as the sole propulsion mode. Additionally, the wing of the present invention is capable of propelling a land based operator on skis or skates. In such instances the load resistance acts on the wing at an effective center of resistance force which is rearward of the center of lift. A force moment results with such moment having a forward thrust component for load propulsion.

Thus it will been seen that there is provided a nonrigid wing aircraft which achieves the various considerations, aspects and features of the present invention and is well suited to meet the conditions of practical usage.

A various changes might be made in the nonrigid wing as above set forth, it is to be understood that all matter herein described as shown in the accompanying drawings is to be interpreted as illustrative and not in a limiting sense.

Having thus described the invention there is claimed as new and desired to be secured by letters Patent:

1. An aircraft, the aircraft comprising a nonrigid wing, the wing having a chordal airfoil configuration, the airfoil configuration including means for generating lift in the presence of airspeed relative to the wing, the lift comprising an upward force the resultant of which is effective at a center of lift, the craft further including means for suspending a payload from the wing, the suspending means including the means for distributing the payload weight between the leading and trailing edges of the wing, the craft, having a center of gravity, the center of gravity being positioned rearwardly of the center of lift.

2. An aircraft constructed in accordance with claim 1 wherein the wing includes a span extending from one wing tip to the other, the means for suspending a payload comprising means for positioning the payload a distance beneath the wing at least as great as the length of the wing span.

3. An aircraft constructed in accordance with claim 2 wherein the payload suspending means comprises flexible shrouds.

4. A aircraft constructed in accordance with claim 1 wherein the means for suspending the payload includes means for flight control, the flight control means including a control stick, the control stick being positioned substantially parallel to the chordal axis, means for carrying the payload beneath the stick, means for changing the attitude of the control stick in response to movement of the payload and means interconnecting the control stick with the wing, the interconnecting means including means for changing the angle of attack of the wing in response to changes in the attitude of the control stick.

5. An aircraft constructed in accordance with claim 4 wherein the interconnecting means includes a plurality of flexible shrouds interconnecting one zone of the control stick with the leading edge of the wing and further plurality of shrouds interconnecting another zone of the control stick with the trailing edge of the wing.

6. An aircraft constructed in accordance with claim 4 wherein the means for flight control includes means for steering control, the steering control means comprising a control bar, the control bar being positioned along an axis substantially perpendicular to the axis of the control stick, means interconnecting the ends of the control bar with the trailing edges of the wing tips, the interconnecting means including means for moving the wing tips in response to changes of position of the control bar.

7. An aircraft constructed in accordance with claim 1 wherein the wing is formed of flexible sheet material, the wing including a dorsal layer, a ventral layer and inflation means for permitting air flow through the wing during flight.

8. An aircraft constructed in accordance with claim 7 wherein the inflation means includes means forming at least one intake orifice adjacent the leading edge of the wing, means forming at least one exhaust opening adjacent the trailing edge of the wing and control means for directing air flow between the intake or office and the exhaust opening.

9. An aircraft constructed in accordance with claim 7 further including means for shaping the airfoil configuration of the wing, the shaping means comprising a plurality of chordal ribs, the ribs being formed of flexible sheet material.

10. An aircraft constructed in accordance with claim 9 wherein the means for permitting air flow through the wing includes means forming openings in the ribs.

11. An aircraft constructed in accordance with claim 9 wherein the ribs extend from the leading edge of wing to the trailing edge.

12. An aircraft constructed in accordance with claim 9 wherein the ribs extend only partially between the leading and trailing edges of the wing.

13. An aircraft constructed in accordance with claim 1 further including a payload, the payload comprising an operator.

14. A dynamically inflated nonrigid wing for providing motive forward thrust forces, the wing comprising a dorsal layer and a ventral layer, both layers being formed of flexible resilient sheet material, the wing having a chordal airfoil configuration, the airfoil confuguration including means for generating lift in the presence of airspeed relative to the wing, the lift comprising an upward force the resultant of which acts effectively at a center of lift, means for coupling a load to the wing, the coupling means including means for distributing a load resistance force to the wing at an effective center of resistance, the effective center of resistance being rearward of the center of lift, the lift force and the load resistance force creating a moment tending to increase the angle of attack of the wing, the force moment having a forward thrust component, the forward thrust component comprising the motive forward thrust.

15. A dynamically inflated nonrigid wing constructed in accordance with claim 14 wherein the load is movable along and in continuous contact with land or water.

16. A dynamically inflated nonrigid wing constructed in accordance with claim 15 wherein the coupling means includes at least one shroud.

17. A dynamically inflated nonrigid wing constructed in accordance with claim 15 wherein the coupling means includes means for continuously tethering the wing to the load.

18. A dynamically inflated nonrigid wing constructed in accordance with claim 15 further including inflation means for permitting air flow between the dorsal and ventral layers.

19. An aircraft, the aircraft comprising a nonrigid wing, the wing having a chordal airfoil configuration, the airfoil configuration including means for generating lift in the presence of airspeed relative to the wing, the lift comprising an upward force the resultant of which is effective at a center of lift, the craft further including means for suspending a payload from the wing, the suspending means including the means for distributing the payload weight between the leading and trailing edges of the wing, the craft having a center of gravity, the center of gravity being positioned rearwardly of the center of lift, the wing being formed of flexible sheet material, the wing including a dorsal layer, a ventral layer and inflation means for permitting air flow through the wing during flight, the means for permitting air flow including a cylindrical plenum, the plenum being positioned adjacent the leading edge of the wing.

20. An aircraft constructed in accordance with claim 19 further including means for shaping the airfoil configuration of the wing, the shaping means a comprising a plurality of chordal ribs, the ribs being formed of flexible sheet material.

21. An aircraft constructed in accordance with claim 20 wherein the means for permitting air flow through the wing includes means forming openings in the ribs.

22. An aircraft constructed in accordance with claim 20 wherein the ribs extend from the leading edge of wing to the trailing edge.

23. An aircraft constructed in accordance with claim 19 further including a payload, the payload comprising an operator.

* * * * *